(12) United States Patent
Bunker

(10) Patent No.: US 10,508,551 B2
(45) Date of Patent: Dec. 17, 2019

(54) ENGINE COMPONENT WITH POROUS TRENCH

(71) Applicant: General Electric Company, Schenectady, NY (US)

(72) Inventor: Ronald Scott Bunker, Placitas, NM (US)

(73) Assignee: General Electric Company, Schenectady, NY (US)

(*) Notice: Subject to any disclaimer, the term of this patent is extended or adjusted under 35 U.S.C. 154(b) by 493 days.

(21) Appl. No.: 15/238,150

(22) Filed: Aug. 16, 2016

(65) Prior Publication Data
US 2018/0051565 A1 Feb. 22, 2018

(51) Int. Cl.
F01D 5/18 (2006.01)
F01D 5/28 (2006.01)
F01D 9/04 (2006.01)
F01D 25/12 (2006.01)
F02K 3/06 (2006.01)
F04D 29/32 (2006.01)
F04D 29/54 (2006.01)
(Continued)

(52) U.S. Cl.
CPC ............ *F01D 5/183* (2013.01); *F01D 5/28* (2013.01); *F01D 9/041* (2013.01); *F01D 9/065* (2013.01); *F01D 25/12* (2013.01); *F02K 3/06* (2013.01); *F04D 29/324* (2013.01); *F04D 29/542* (2013.01); *F04D 29/582* (2013.01); *F04D 29/5846* (2013.01); *F05D 2220/30* (2013.01); *F05D 2240/121* (2013.01); *F05D 2240/303* (2013.01); *F05D 2250/232* (2013.01); *F05D 2250/294* (2013.01); *F05D 2260/203* (2013.01); *F05D 2260/232* (2013.01); *F05D 2300/514* (2013.01); *F05D 2300/612* (2013.01); *Y02T 50/676* (2013.01)

(58) Field of Classification Search
CPC . F01D 5/183; F01D 5/28; F01D 9/041; F01D 9/065; F01D 25/12; F02K 3/06; F04D 29/324; F04D 29/542; F04D 29/582; F04D 29/5846
See application file for complete search history.

(56) References Cited

U.S. PATENT DOCUMENTS 5,363,645 A 11/1994 Pellet
5,641,014 A 6/1997 O'Connor et al.
(Continued)

FOREIGN PATENT DOCUMENTS

CN 1816645 A 8/2006
CN 101173610 A 5/2008

OTHER PUBLICATIONS

Chinese Office Action and Search Report corresponding to Chinese Application No. 20171070868.8 dated May 13, 2019.
(Continued)

*Primary Examiner* — Carlos A Rivera
*Assistant Examiner* — Behnoush Haghighian
(74) *Attorney, Agent, or Firm* — McGarry Bair PC

(57) ABSTRACT

An apparatus and method for cooling an engine component, such as an airfoil, including a wall to separate a hot flow from a cooling fluid flow. The component can include at least one trench disposed in a hot surface. The trench can be fed with the cooling fluid flow to cool the engine component along the hot surface with the cooling fluid flow.

21 Claims, 6 Drawing Sheets

(51) Int. Cl.
   *F04D 29/58* (2006.01)
   *F01D 9/06* (2006.01)

(56) References Cited

U.S. PATENT DOCUMENTS

| | | | |
|---|---|---|---|
| 5,690,473 A * | 11/1997 | Kercher | F01D 5/183 |
| | | | 415/115 |
| 5,810,552 A | 9/1998 | Frasier | |
| 6,050,777 A * | 4/2000 | Tabbita | F01D 5/186 |
| | | | 29/889.721 |
| 6,255,000 B1 | 7/2001 | O'Connor et al. | |
| 6,375,425 B1 | 4/2002 | Lee et al. | |
| 6,443,700 B1 * | 9/2002 | Grylls | F01D 5/182 |
| | | | 416/229 R |
| 6,461,107 B1 | 10/2002 | Lee et al. | |
| 6,499,949 B2 | 12/2002 | Schafrik et al. | |
| 6,551,061 B2 | 4/2003 | Darolia et al. | |
| 6,617,003 B1 | 9/2003 | Lee et al. | |
| 6,637,500 B2 | 10/2003 | Shah et al. | |
| 6,905,302 B2 | 6/2005 | Lee et al. | |
| 7,513,744 B2 | 4/2009 | Cunha et al. | |
| 7,658,590 B1 | 2/2010 | Spanks | |
| 7,976,909 B2 | 7/2011 | Durandeau et al. | |
| 8,387,245 B2 | 3/2013 | Bunker et al. | |
| 8,499,566 B2 | 8/2013 | Lacy et al. | |
| 8,528,208 B2 | 9/2013 | Rebak et al. | |
| 8,575,513 B2 | 11/2013 | Abdo et al. | |
| 8,673,397 B2 | 3/2014 | Bunker et al. | |
| 8,727,727 B2 | 5/2014 | Bunker et al. | |
| 8,753,071 B2 | 6/2014 | Bunker | |
| 8,815,371 B2 | 8/2014 | Arrell et al. | |
| 8,974,859 B2 | 3/2015 | Bunker | |
| 9,003,657 B2 * | 4/2015 | Bunker | C23C 4/02 |
| | | | 29/889.7 |
| 9,309,771 B2 * | 4/2016 | Xu | F01D 5/186 |
| 10,100,666 B2 * | 10/2018 | Brzek | F01D 25/12 |
| 2010/0040478 A1 * | 2/2010 | Abdel-Messeh | F01D 5/187 |
| | | | 416/97 R |
| 2013/0039777 A1 * | 2/2013 | Piggush | F01D 5/186 |
| | | | 416/97 R |
| 2014/0072448 A1 | 3/2014 | Prue et al. | |
| 2015/0064019 A1 | 3/2015 | Lacy et al. | |
| 2015/0321289 A1 | 11/2015 | Bruck et al. | |
| 2017/0328221 A1 * | 11/2017 | Allen | F01D 5/187 |
| 2018/0156039 A1 * | 6/2018 | Tallman | F01D 5/186 |

OTHER PUBLICATIONS

Chinese Patent Office, Second Office Action re Chinese Patent Application No. 201710701868.8, dated Sep. 17, 2019, 8 pages, China.

* cited by examiner

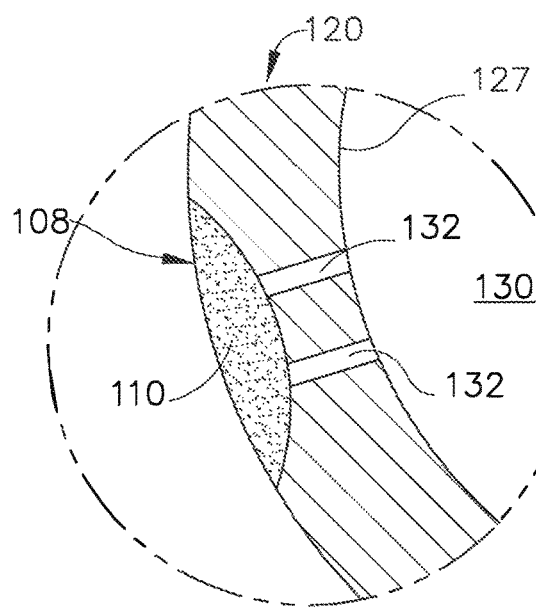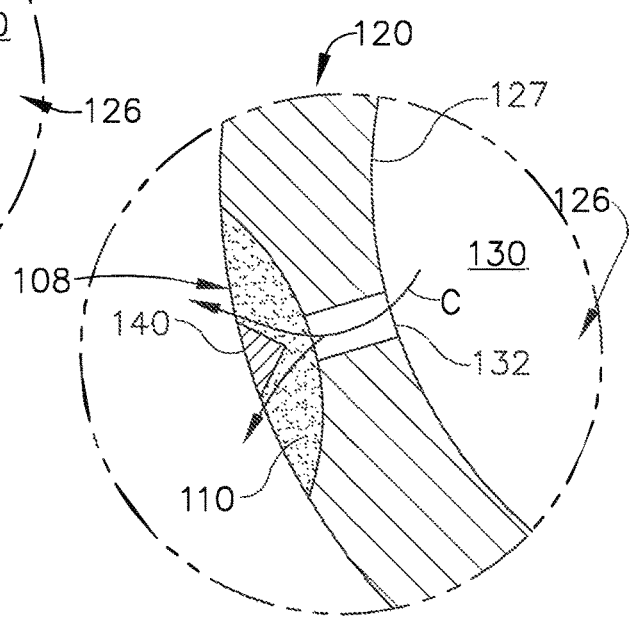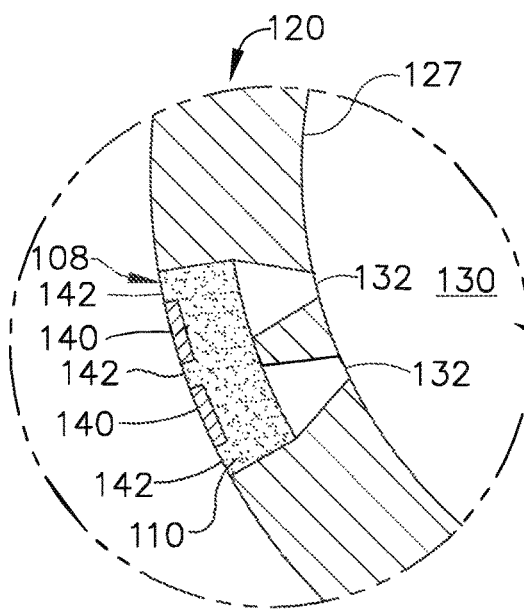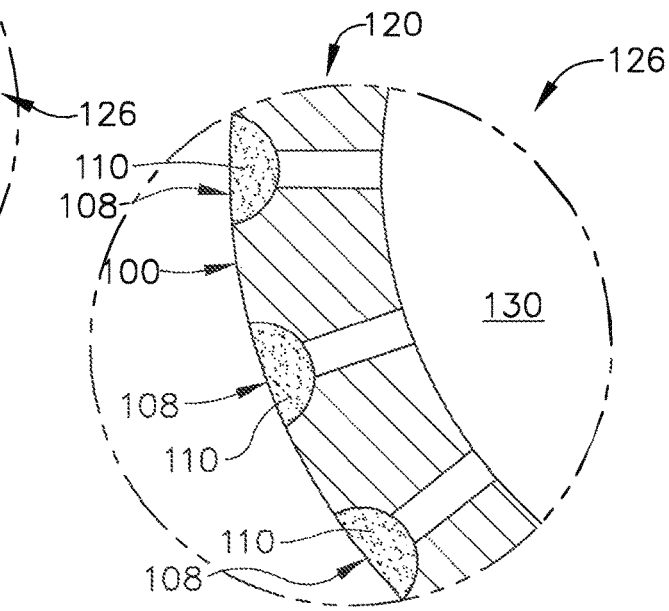

ENGINE COMPONENT WITH POROUS TRENCH

BACKGROUND OF THE INVENTION

Turbine engines, and particularly gas or combustion turbine engines, are rotary engines that extract energy from a flow of combusted gases passing through the engine onto a multitude of rotating turbine blades.

Turbine engines for aircraft, such as gas turbine engines, are often designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine components, such as blades, can include one or more interior cooling circuits for routing the cooling air through the component to cool different portions of the component, and can include dedicated cooling circuits for cooling different portions of the component, such as the leading edge, trailing edge, or tip of the blade.

BRIEF DESCRIPTION OF THE INVENTION

In one aspect, embodiments of the invention relate to a component for a turbine engine, which generates a hot flow and provides a cooling fluid flow. The component includes a wall defining an interior and separating the hot flow from the cooling fluid flow and having a hot surface along with the hot flow and a cooling surface facing the cooling fluid flow. The component further includes at least one trench disposed in the hot surface and at least one hole in the wall fluidly coupling the interior to the trench. A porous material at least partially fills the trench.

In another aspect, embodiments of the invention relate to an airfoil for a turbine engine including a wall bounding an interior and defining a pressure side and a suction side extending chord-wise between a leading edge and a trailing edge, and extending in the span-wise direction between the root and the tip. The airfoil further includes at least one trench extending in the span-wise direction near or along the leading edge and at least one hole in the wall fluidly coupling the interior to the trench. A porous material at least partially fills the trench.

In yet another aspect, embodiments of the invention relate to a method of providing a cooling fluid along a trench disposed along a leading edge of an airfoil for a turbine engine. The method comprises (1) supplying a flow of cooling fluid to the interior of the airfoil; (2) passing the flow of cooling fluid through a porous material located in the trench; and (3) exhausting the cooling fluid through the trench.

BRIEF DESCRIPTION OF THE DRAWINGS

In the drawings:

FIG. 4 is an enlarged view of the leading edge of the airfoil of FIG. 2 having two holes coupling an interior of the airfoil to the trench according to an embodiment of the invention.

FIG. 5 is an enlarged view of the leading edge of the airfoil of FIG. 2 including a solid element disposed in the trench according to an embodiment of the invention.

FIG. 6 is an enlarged view of the leading edge of the airfoil of FIG. 2 illustrating alternative geometries for the solid element, the trench, and the holes according to an embodiment of the invention.

FIG. 7 is an enlarged view of a leading edge of an airfoil of the turbine engine of FIG. 1 illustrating three spaced trenches along the leading edge according to an embodiment of the invention.

DESCRIPTION OF EMBODIMENTS OF THE INVENTION

Figure 1:
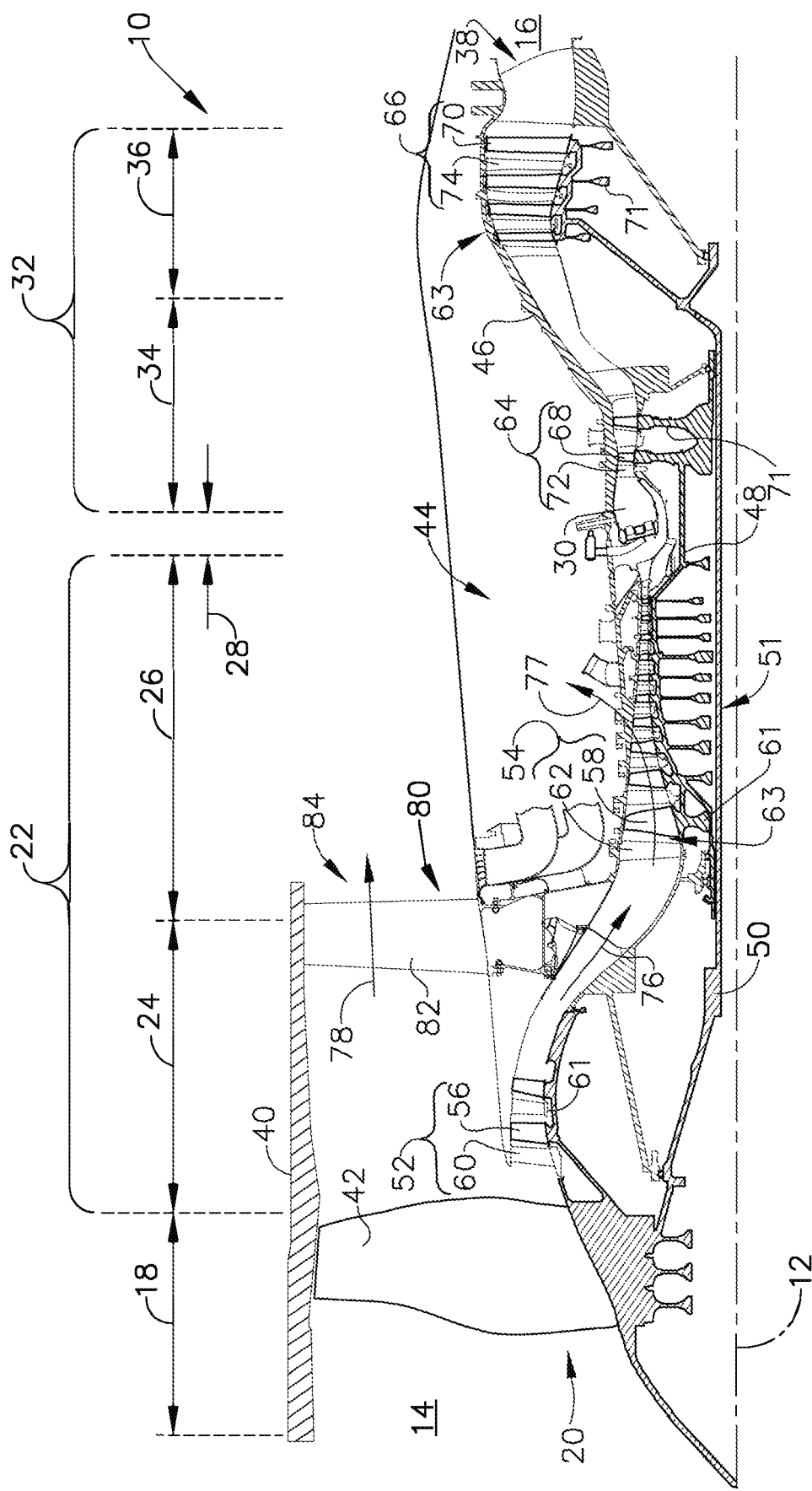
FIG. 1 is a schematic cross-sectional diagram of a turbine engine for an aircraft.

The described embodiments of the present invention are directed to a trench having porous material for cooling an airfoil for a gas turbine engine. For purposes of illustration, the present invention will be described with respect to the airfoil for an aircraft gas turbine engine. It will be understood, however, that the invention is not so limited and may have general applicability within an engine, including compressors, as well as in non-aircraft applications, such as other mobile applications and non-mobile industrial, commercial, and residential applications. Additionally, the aspects will have applicability outside of an airfoil, and can extend to any engine component requiring cooling, such as a blade, vane, shroud, or a combustion liner in non-limiting examples.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be draw from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
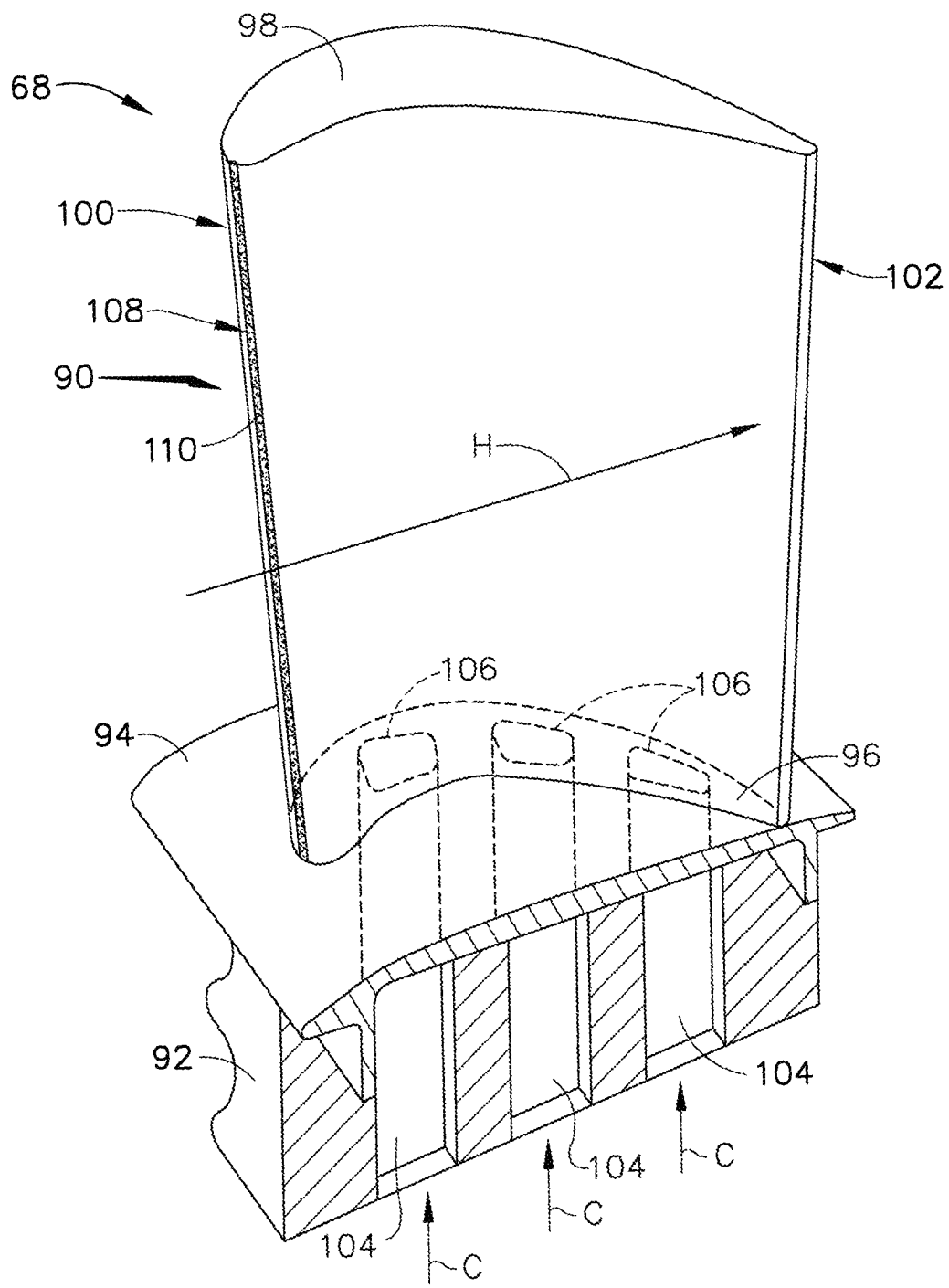
FIG. 2 is a perspective view of an engine component of the turbine engine of FIG. 1 illustrated as an airfoil.

Referring now to FIG. 2, an engine component is shown in the form of an airfoil 90, which can be one of the turbine blades 68 of the engine 10 of FIG. 1, for example. Alternatively, the engine component can include a vane, a shroud, or a combustion liner in non-limiting examples, or any other engine component that can require or utilize cooling, such as film cooling. The airfoil 90 couples to a dovetail 92 and a platform 94. The airfoil 90 extends radially between a root 96 and a tip 98 defining a span-wise direction. The airfoil 90 extends axially between a leading edge 100 and a trailing edge 102 defining a chord-wise direction. The dovetail 92 can be integral with the platform 94, which can couple to the airfoil 90 at the root 96. The dovetail 92 can be configured to mount to a turbine rotor disk on the engine 10, for example. The platform 94 helps to contain the turbine airflow radially. The dovetail 92 includes at least one inlet passage 104, shown as three inlet passages 104, each extending through the dovetail 92 in fluid communication with the airfoil 90 at a passage outlet 106. It should be appreciated that the dovetail 92 is shown in cross-section, such that the inlet passages 104 are housed within the dovetail 92.

A trench 108 extends along the leading edge 100 from the root 96 to the tip 98. It should be appreciated that the trench 108 can extend only partially between the root 96 and the tip 98, and can be any length. A porous material 110 is disposed in the trench 108 and can fill the trench 108, forming a continuous, arcuate surface along with the rest of the airfoil 90.

The trench 108, as well as any trench described herein, can be an elongated cavity formed in the airfoil 90, extending in the span-wise direction, for example. It should be appreciated that the trench can extend in any direction, such as span-wise, chord-wise, radial, axial, tangential, circumferential, or any combination thereof in non-limiting examples, particularly for engine components other than an airfoil. The trench 108, can include a length and a width. In one example, the ratio of length to width can be at least 2:1. It should be understood, however, that the trench can include other ratios of length to width. The trench 108 can be any shape, such as rectilinear shapes including rectangular. Alternative shapes can include curvilinear, square, circular, geometric, or unique, such as potentially a serpentine trench in non-limiting examples. The trench 108, in one non-limiting example, can include a depth that is at least one-half of the width, or at least a 1:2 ratio of depth to width. It should be understood that any depth is contemplated. The cross-sectional profile of the trench 108 with the section defined in the direction of the depth, can include any shape, such as semicircular, square, rectangular, triangular, conic, arcuate, curvilinear, or rectilinear in non-limiting examples. It should be appreciated that the trench can be any combination of shapes and cross-sections as described herein.

The porous material 110 can be formed by additive manufacturing, while it is contemplated that the entire airfoil 90 can be formed by additive manufacturing. It should be appreciated that any portion of the airfoil 90 can be made by any known method including but not limited to, casting, machining, additive manufacturing, coating, or otherwise. The porous material 110 can define a porosity, being permeable by a volume of fluid, such as air. The porous material 110 can have a particular porosity to meter the flow of a fluid passing through the porous material 110 at a predetermined rate. It should be appreciated that additive manufacturing can be used to achieve a particular local porosity along the porous material 110, as well as a consistent porosity across the entirety of the porous material 110, as compared to traditional method of forming the porous material 110. In alternative examples, the porous material 110 can be made of any of the methods described above, such that a porosity is defined. In one non-limiting example, the porous material 110 can be made of Ni, NiCrAlY, NiAl, or similar materials. The porous material 110 can further be made of a nickel foam, for example.

During operation of the gas turbine engine, a hot flow H is driven by the blade to generate thrust. A cooling fluid flow C is provided to the airfoil 90 for cooling. The cooling fluid flow C can be exhausted through the porous material 110 in the trench 108 to cool the leading edge 100 of the airfoil 90.

Figure 3:
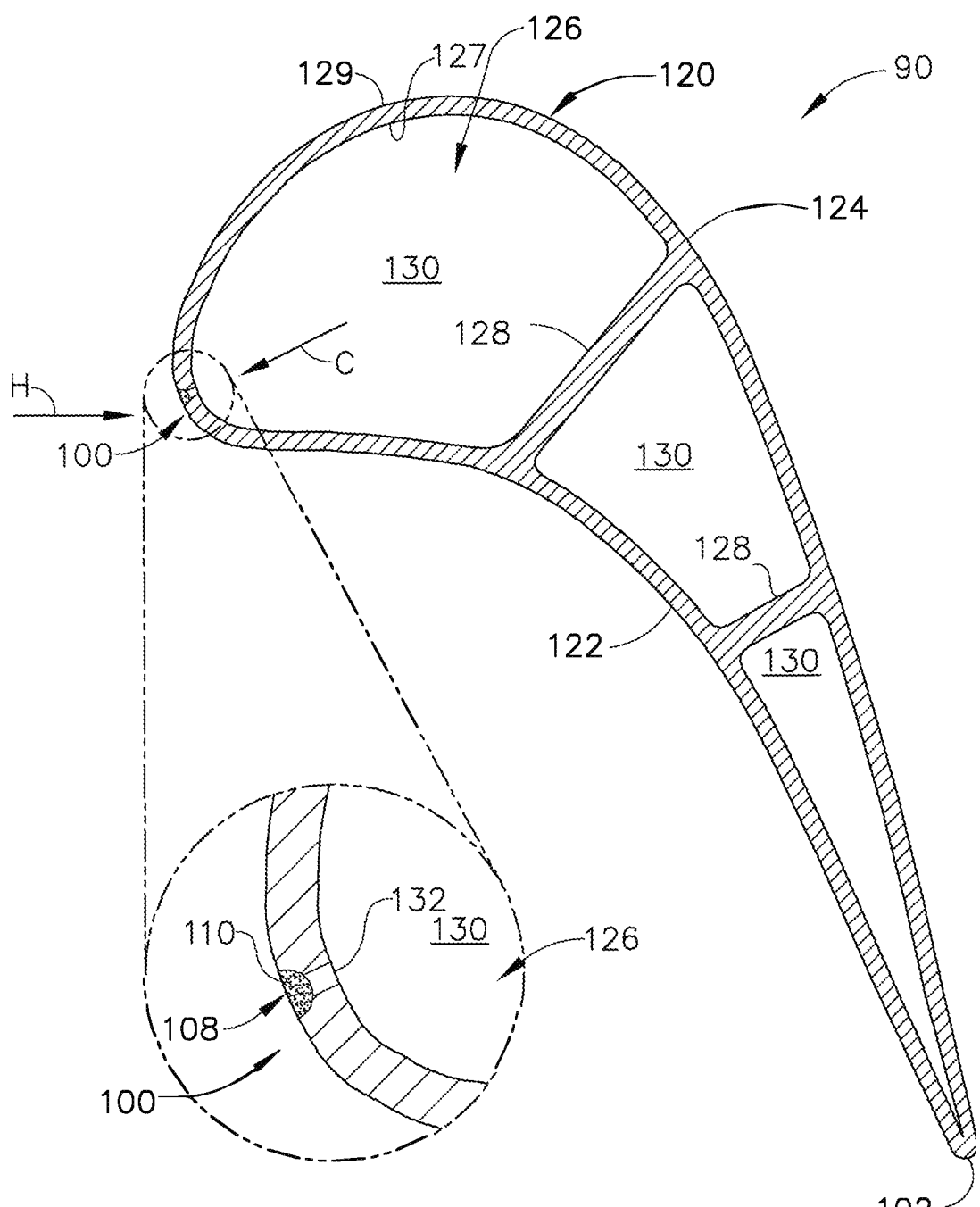
FIG. 3 is a cross-sectional view of the airfoil of FIG. 2 including a trench along the leading edge according to an embodiment of the invention.

Referring now to FIG. 3, a cross-sectional view of the airfoil 90 illustrates a wall as a wall 120 of the airfoil 90 including a pressure side 122 and a suction side 124 extending between the leading edge 100 and the trailing edge 102. An interior 126 of the airfoil 90 is defined by the wall 120.

The cooling fluid flow C can be provided to the interior 126 defining a cooling surface 127 along the interior 126 of the airfoil 90. The hot flow H can define a hot surface 129 along the exterior of the wall 120. One or more internal ribs 128 separates the interior 126 into passages 130 extending in the span-wise direction. The passages 130 can define one or more cooling circuits throughout the airfoil 90. Additionally, the cooling circuits can be further includes micro-circuits, sub-circuits, near wall cooling circuits, leading edge passages, trailing edge passages, pin fins, pin banks, additional passages, flow enhancers such as turbulators, or other structures which can define the cooling circuits in non-limiting examples.

A hole 132 is disposed in the wall 120 fluidly coupling the interior 126 to the trench 108. The hole 132 can be a plurality of holes 132 extending along the leading edge 100 in the span-wise direction for coupling the interior 126 to the trench 108 at different radial locations along the airfoil 90. Alternatively, the hole 132 can be an elongated slot, extending for at least a portion of the trench 108.

In operation, the flow of cooling fluid C is provided from the interior 126 of the airfoil 90 to the hole 132. As a plurality of holes 132, the passage 130 adjacent the holes 132 can extend in the span-wise direction, providing the flow of cooling fluid C to the plurality of holes 132 in the span-wise direction. The cooling fluid C within the holes 132 flows to the trench 108 and spreads through the porous material 110. From the porous material 110 in the trench 108, the cooling fluid C can disperse along the hot surface 129 along or adjacent the trench 108, operating as a cooling film along the hot surface 129.

Referring to FIG. 4, another example of the airfoil 90 is illustrated having two holes 132 fluidly coupling the interior 126 to the trench 108. The holes 132 as illustrated are at the same span-wise distance along the wall 120, positioned radially next to one another. As such, a plurality of holes 132 can be arranged as parallel rows extending in the span-wise direction. The holes 132 in the rows can be radially aligned with one another or offset. While two adjacent holes 132 are illustrated, it should be appreciated that any number of holes 132 can be included, forming any number or rows or columns. Additional holes 132 can increase the flow rate of cooling fluid C provided to the trench 108 or can provide directionality of the flow of cooling fluid C to a particular portion of the trench 108.

Referring now to FIG. 5 another example is illustrated having a solid element 140 disposed in the porous material 110 within the trench 108. The solid element 140 can be formed in the porous material 110, such as by additive manufacturing, similar to the porous material 110, or can be formed by any other method. Alternatively, the sold element 140 can be mounted within the porous material 110. The solid element 140, in one non-limiting example, can be an elongated member extending the length of the trench 108, and can have a triangular profile. As such, the sides of the triangular shape can direct the cooling fluid C within the porous material 110 to the sides of the solid element 140. Thus, the cooling fluid C can, for example, be separated toward the pressure side 122 and the suction side 124 of the airfoil 90 apart from the leading edge 100. In another example, the solid elements 140 can be discrete conic members disposed in the porous material 110, having the triangular profile as shown. Each discrete conic solid element 140 can be positioned at the outlet of the hole 132 to direct the flow of cooling fluid C toward the pressure and suction sides 122, 124, as well as radially above and below the solid element 140 along the trench 108.

It should be appreciated that the solid element 140 can be any shape, or size, having any position within the trench 108 or porous material 110 for directing the flow of cooling fluid C. The solid element 140 can be a single element or multiple discrete elements. Furthermore, the solid element 140 can be made of a porous material. In such an example, the solid element 140 would have a lesser porosity than the porous material 110 within the trench 108 to direct the flow of cooling fluid C while permitting a portion of the cooling fluid C to pass through the solid element 140.

Referring now to FIG. 6, another example is shown having a rectilinear trench 108 curved to follow the shape of the airfoil 90. Two solid elements 140 are disposed in the trench 108 to define three outlets 142 from the porous material 110. The holes 132 include an increasing cross-sectional area moving from the interior 126 toward the trench 108. The increasing cross-sectional area can evenly disperse a flow of cooling fluid C throughout the trench 108 as well as operate to meter the flow of cooling fluid C from the interior 126.

It should be understood that the trench 108, holes 132, and solid elements 140 as illustrated in FIG. 6 are exemplary. It should be further understood that the trench 108 can be any shape, extending at least partially in the span-wise direction, being linear, curvilinear, arcuate, adapted to follow the curve of the wall 120 of the airfoil 90, and having any cross-sectional area, profile, or shape, such as semicircular, curvilinear, rectilinear, or arcuate, or any combination thereof. The trench 108 can be aligned along the leading edge 100, or can be near or adjacent to the leading edge 100. Furthermore, the trench 108 need not be linear in the span-wise direction, but can generally extend in the span-wise direction, curving or varying from span-wise or radial extension. Such an example could include a serpentine pattern for the trench 108.

It should also be understood that the holes 132 are not limited as shown, and can include one or more holes 132, such as multiple holes 132, fluidly coupling the interior 126 to the trench 108. The holes 132 can be organized in patterns, such as rows, columns, or clusters for example. The holes 132 can be any shape, such as circular or elliptical. In another example, the hole 132 can be a single slot extending along at least a portion of the trench 108. The holes 132 can be angled, for example, such as extending in a combined axial and radial direction, or in three-dimensional space. The holes 132 can further meter the flow of cooling fluid C, such as having a metering portion, or increasing or decreasing cross-sectional areas.

It should be further understood that the solid elements 140 can include any shape, size, geometry, pattern or organization to direct a flow of cooling fluid within the trench 108. In the case of multiple solid elements 140, different solid elements 140 can vary among one another based upon the local airfoil 90 cooling needs or the particular local cooling flow C.

Further still, the porous material 110, can be a structured porous material or a random porous material, or any combination thereof. A structured porous material includes a determinative porosity throughout the material, which can have particular local increases or decreases in porosity to meter a flow of fluid passing through the structured porous material. Such local porosities can be determined and controlled during manufacture. Additive manufacturing can be used to form a structured porous material, in one non-limiting example. Alternatively, the porous materials can have a random porosity. The random porosity can be adapted to have a porosity as the average porosity over an area of the porous material, having discrete variable porosities that are random. A random porous material can be made from a nickel foam, in one non-limiting example.

Referring now to FIG. 7, another example shows that the airfoil 90 can include multiple trenches 108 organized in chord-wise alignment, such as three parallel trenches 108. The trenches 108 can be linear or non-linear. The trenches 108 can be aligned symmetrically with the leading edge 100, such that the middle trench 108 extends along the leading edge 100, or can be offset, as particular cooling needs of the airfoil 90 can dictate.

It should be appreciated that each trench, such as the exemplary trenches in FIGS. 3-7, can include an apex as the point of the trench nearest to the interior 126 of the airfoil 90. In one example, the hole 132 can be positioned at the apex of the trench. Furthermore, the hole 132 can be aligned at the center of the apex, or partially offset from the apex to provide a deterministic flow into the trench.

Figure 8:
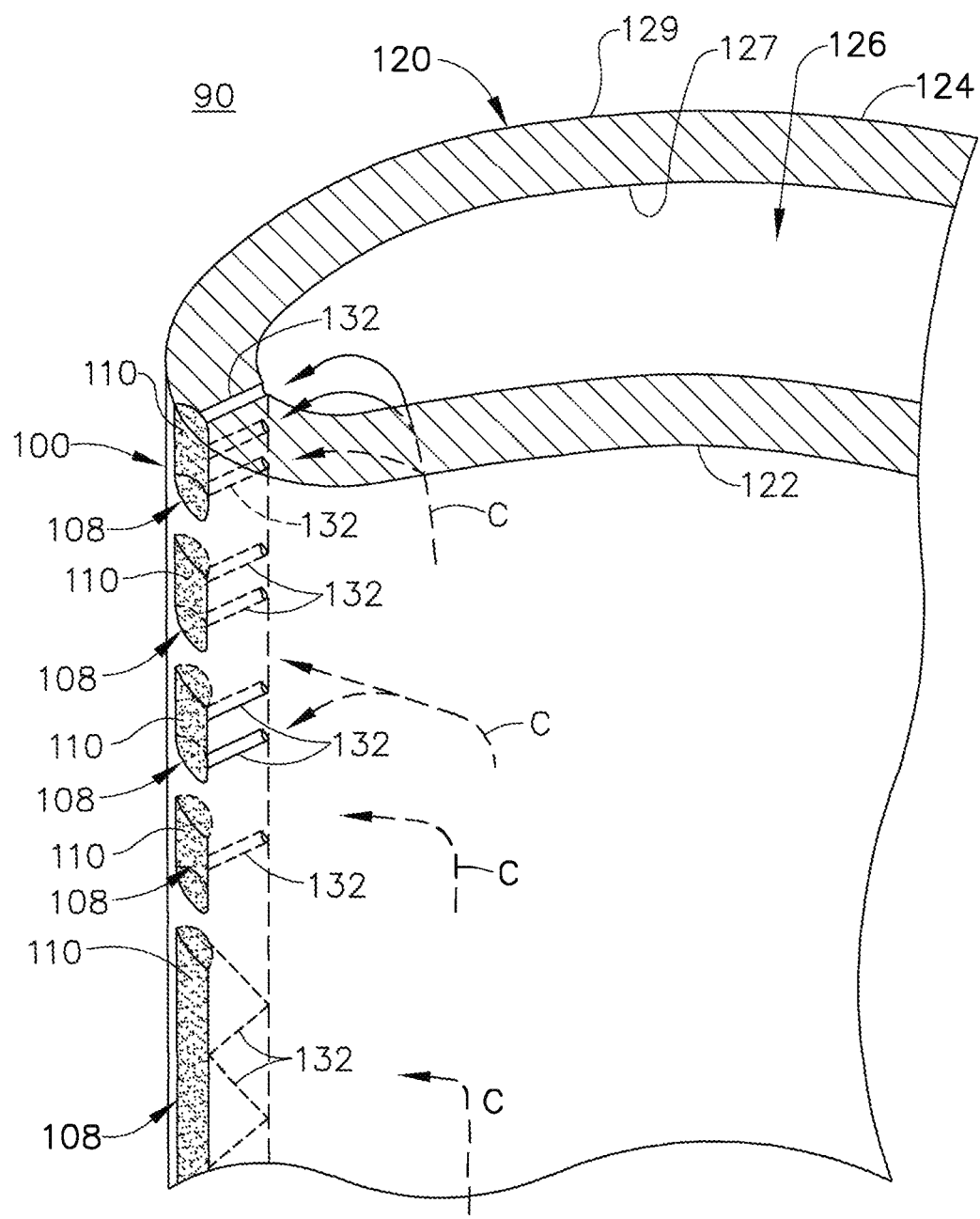
FIG. 8 is a perspective view of a leading edge of an airfoil of the turbine engine of FIG. 1 illustrating multiple trenches in span-wise arrangement coupled to an interior of the airfoil.

Referring now to FIG. 8, another example shows the airfoil 90 having multiple discrete trenches 108 organized in the span-wise direction. The trench 108 need not extend fully in the span-wise direction, and can discretely extend radially along the airfoil 90 to define multiple trenches 108. The multiple trenches 108 can be tailored to the local cooling needs of the airfoil 90, having more or less holes 132 feeding the particular trench 108 to provide for increased or decreased cooling flows C. Additionally, the trenches 108, holes 132, or solid elements 140 can vary among trenches 108 to define a particular local flow based upon the local cooling needs of the airfoil 90. Furthermore, it is contemplated that the trenches 108 are used in combination with film holes or other cooling structures.

Figure 9:
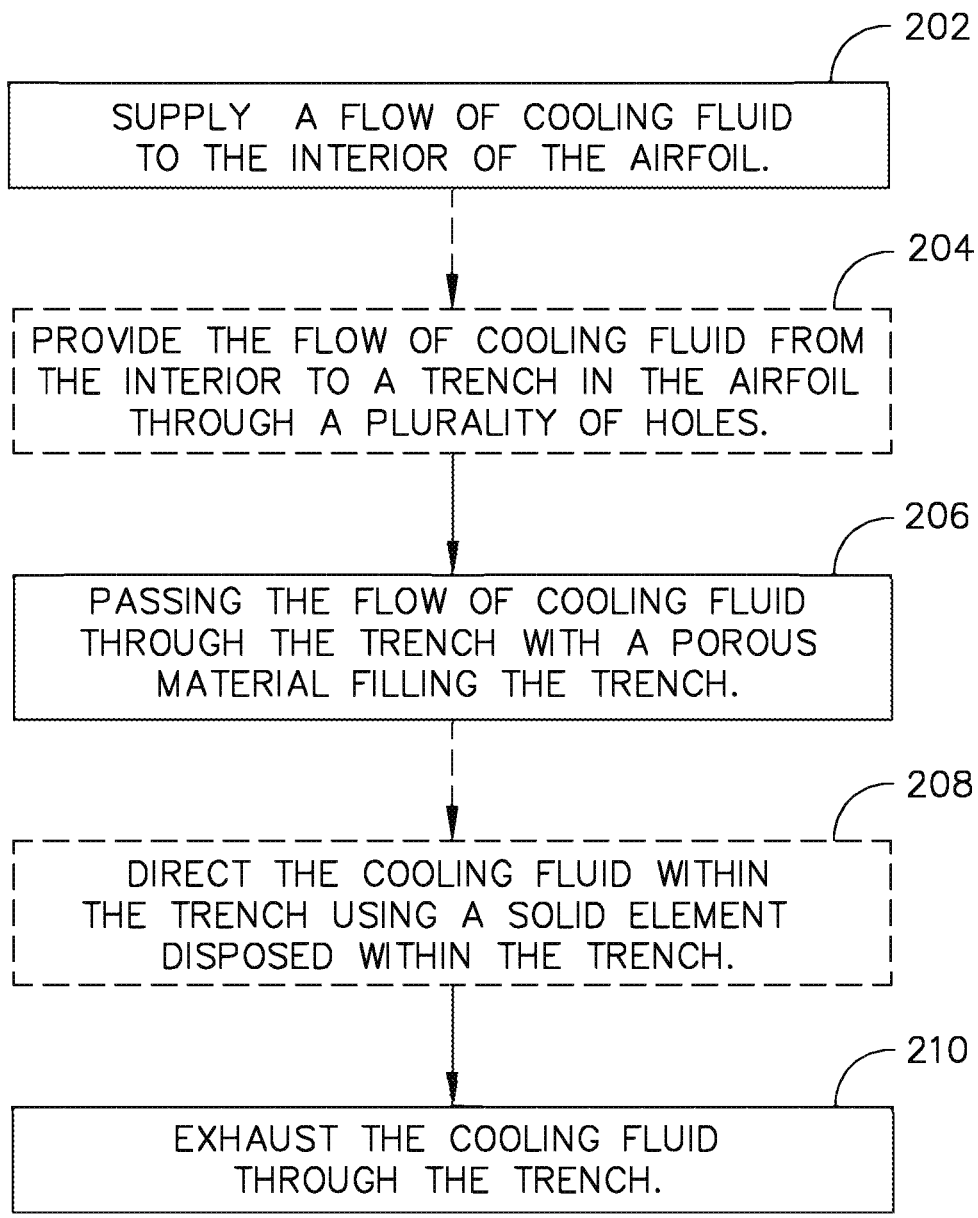
FIG. 9 is a flow chart illustrating a method of providing a cooling fluid along a trench disposed along a leading edge of an airfoil.

Referring now to FIG. 9, a method 200 of providing a cooling fluid along a trench disposed along a leading edge of an airfoil for a turbine engine can include (1) supplying a flow of cooling fluid to an interior of the airfoil; (2) passing at least a portion of the flow of cooling fluid through the trench with a porous material filling the trench; and (3) exhausting the cooling fluid through the trench.

At 202, the method 200 includes supplying a flow of cooling fluid C to the interior 126 of the airfoil 90, which can include providing the cooling fluid C through the inlet passages 104 as shown in FIG. 2, for example. At 204, the method 200 can optionally include providing the flow of cooling fluid C from the interior 126 to the trench 108 in the airfoil 90 through a plurality of holes, which can be the holes 132 as described in FIGS. 3-8, fluidly coupling the interior 126 to the trench 108.

At 206, the method 200 includes passing the flow of cooling fluid C through the trench 108 with a porous material 110 filling the trench 108, such as the porous material 110 shown in FIGS. 3-8. The porous material 110 can be a structured porous material, having a particular deterministic porous structure to define local porosities to affect local flows. It is also contemplated that the porous material has a random porosity.

At 208, optionally, the method 200 can include directing the cooling fluid flow C within the trench 108 using a solid element 140 disposed within the trench 108. Such solid elements 140 can be those seen in FIGS. 5-6 and can be shaped to particularly direct the cooling fluid flow C.

At 210, the method 200 can include exhausting the cooling fluid flow C through the trench 108. Such exhausted flow can be used as a cooling film along the hot surface 129 to cool the airfoil 90 or prevent excessive heat aggregation within the wall 120 of the airfoil 90, particularly along the leading edge 100.

It should be appreciated that while the description is directed toward a leading edge of the airfoil, the concepts as described herein can have equal applicability in additional engine components, such as a vane, shroud, or combustion liner in non-limiting examples, and the trench can be formed in any region of any engine component or airfoil requiring cooling, such as regions typically requiring film cooling holes or multi-bore cooling.

It should be further appreciated that the trench 108 having the porous material 110 can provide for improved film cooling, such as providing improved directionality, metering, or local flow rates. Additionally, the porous material included in the trench 108 can further improve the film cooling to an entire region beyond just the areas local to the film holes.

It should be further appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A component for a turbine engine, which generates a hot flow and provides a cooling fluid flow, the component comprising:
    an outer wall defining an interior and separating the hot flow from the cooling fluid flow and having a hot surface facing the hot flow and a cooling surface facing the cooling fluid flow;
    at least one trench disposed in the hot surface;
    at least one hole including an inlet and an outlet in the outer wall fluidly coupling the interior to the trench;
    a porous material at least partially filling the at least one trench and located at the outlet of the at least one hole; and
    a solid non-porous element provided within the porous material.

2. The component of claim 1 wherein the at least one trench includes multiple trenches.

3. The component of claim 2 wherein the multiple trenches are spaced from each other.

4. The component of claim 3 wherein the multiple trenches are parallel to each other.

5. The component of claim 3 wherein the multiple trenches are arranged in a row.

6. The component of claim 3 wherein the multiple trenches are arranged in one of a row or parallel to one another.

7. The component of claim 6 wherein the multiple trenches include an arcuate profile defining an apex and the at least one hole is disposed on the apex.

8. The component of claim 1 wherein the at least one hole includes multiple holes.

9. The component of claim 8 wherein the multiples holes are arranged in a row.

10. The component of claim 1 wherein the solid non-porous element is shaped to direct a flow of cooling fluid passing through the porous material.

11. An airfoil for a turbine engine, the airfoil comprising:
    an outer wall bounding an interior and defining a pressure side and a suction side extending chord-wise between a leading edge and a trailing edge and extending in a span-wise direction between a root and a tip;
    multiple discrete trenches aligned with one another in the span-wise direction near or along the leading edge, with at least some of the multiple trenches having different lengths in the span-wise direction;
    multiple holes in the outer wall fluidly coupling the interior to the multiple discrete trenches; and
    a porous material provided in each of the multiple discrete trenches.

12. The airfoil of claim 11 wherein the multiple discrete trenches are arranged along the leading edge.

13. The airfoil of claim 11 wherein the multiple discrete trenches are parallel to each other.

14. The airfoil of claim 11 wherein the multiple discrete trenches are arranged in a row.

15. The airfoil of claim 11 wherein the multiple discrete trenches are arranged in one of a row or parallel to one another.

16. The airfoil of claim 11 wherein the multiple discrete trenches includes an arcuate profile defining an apex and the multiple holes are disposed at the apex.

17. The airfoil of claim 11 wherein the multiple holes are arranged in at least one row.

18. The airfoil of claim 11 further comprising a solid non-porous element extending at least partially along the multiple discrete trenches.

19. A method of providing a flow of cooling fluid along a trench disposed along a component for a turbine engine, the method comprising:
    supplying the flow of cooling fluid to an interior of the component;
    passing at least a portion of the flow of cooling fluid through at least one hole that includes an inlet and an outlet, and through a porous material located at the outlet of the at least one hole;
    directing the flow of cooling fluid using a solid non-porous element disposed in the porous material; and
    exhausting the flow of cooling fluid through the trench.

20. The method of claim 19 wherein the component is an airfoil with the trench disposed along a leading edge of the airfoil.

21. The method of claim 19 further comprising providing the flow of cooling fluid from the interior with the at least one hole to the trench through a plurality of holes wherein the at least one hole is included in the plurality of holes.

* * * * *